US009790101B2

(12) United States Patent
Mehmi et al.

(10) Patent No.: US 9,790,101 B2
(45) Date of Patent: Oct. 17, 2017

(54) MULTI-PORT FLOW SWITCHING VALVE

(71) Applicant: HydroNovation, Inc., La Palma, CA (US)

(72) Inventors: Ramandeep Mehmi, Livermore, CA (US); Edward Smallhorn, Dartmouth (CA); Sheng-Nan Lin, Pingtung (TW)

(73) Assignee: HydroNovation, Inc., La Palma, CA (US)

( * ) Notice: Subject to any disclaimer, the term of this patent is extended or adjusted under 35 U.S.C. 154(b) by 0 days.

(21) Appl. No.: 15/124,961

(22) PCT Filed: Mar. 11, 2015

(86) PCT No.: PCT/US2015/019946
§ 371 (c)(1),
(2) Date: Sep. 9, 2016

(87) PCT Pub. No.: WO2015/138599
PCT Pub. Date: Sep. 17, 2015

(65) Prior Publication Data
US 2017/0029288 A1 Feb. 2, 2017

Related U.S. Application Data

(60) Provisional application No. 61/952,304, filed on Mar. 13, 2014.

(51) Int. Cl.
*C02F 1/42* (2006.01)
*C02F 1/00* (2006.01)
(Continued)

(52) U.S. Cl.
CPC .............. *C02F 1/008* (2013.01); *B01D 61/48* (2013.01); *C02F 1/42* (2013.01); *C02F 1/4695* (2013.01);
(Continued)

(58) Field of Classification Search
CPC .......... C02F 1/008; C02F 1/4695; C02F 1/42; C02F 2201/005; C02F 2209/02;
(Continued)

(56) References Cited

U.S. PATENT DOCUMENTS

| 3,044,491 A | 7/1962 | Sangster |
| 3,530,883 A | 9/1970 | Kramer |

(Continued)

FOREIGN PATENT DOCUMENTS

| CN | 1184910 A | 6/1998 |
| CN | 1280262 A | 1/2001 |

(Continued)

OTHER PUBLICATIONS

International Search Report for International Application No. PCT/US2015/019946 dated Jun. 9, 2015.

*Primary Examiner* — Walter D Griffin
*Assistant Examiner* — Cameron Allen
(74) *Attorney, Agent, or Firm* — Lando & Anastasi, LLP

(57) ABSTRACT

A valve assembly for controlling fluid flow is provided. The valve assembly includes a housing having a first chamber and a second chamber, an actuator assembly configured to move between a first position and a second position within the first and second chambers, a plurality of fluid ports in fluid communication with the first chamber, and a plurality of fluid ports in fluid communication with the second chamber. The first position of the actuator assembly defines a first series of fluid flowpaths through the plurality of fluid ports of the first and second chambers. The second position of the actuator assembly defines a second series of fluid flowpaths through the plurality of fluid ports of the first and second chambers.

20 Claims, 9 Drawing Sheets

(51) Int. Cl.
  *B01D 61/48* (2006.01)
  *C02F 1/469* (2006.01)
  *F16K 11/07* (2006.01)
  *F16K 31/122* (2006.01)

(52) U.S. Cl.
  CPC .......... *F16K 11/07* (2013.01); *F16K 11/0712* (2013.01); *F16K 31/122* (2013.01); *C02F 2201/005* (2013.01); *C02F 2209/02* (2013.01); *C02F 2209/03* (2013.01); *C02F 2209/05* (2013.01); *C02F 2209/06* (2013.01); *C02F 2209/07* (2013.01); *C02F 2209/10* (2013.01); *C02F 2209/11* (2013.01); *C02F 2209/40* (2013.01); *C02F 2209/44* (2013.01); *C02F 2303/16* (2013.01)

(58) Field of Classification Search
  CPC .............. C02F 2209/11; C02F 2209/07; C02F 2209/05; C02F 2209/06; C02F 2209/03; C02F 2209/10; C02F 2209/44; C02F 2303/16; B01D 61/48; F16K 11/0712; F16K 31/122; F16K 31/1245; F16K 11/07; F15B 13/0402; F15B 13/042; F15B 2211/8603; E05F 15/49; Y10T 137/86582
  See application file for complete search history.

(56) References Cited

U.S. PATENT DOCUMENTS

| | | | |
|---|---|---|---|
| 3,589,401 A * | 6/1971 | Harding | F15B 13/04 |
| | | | 137/625.67 |
| 3,762,443 A | 10/1973 | Sorenson | |
| 3,986,522 A | 10/1976 | Janvrin | |
| 4,058,135 A | 11/1977 | Petro | |
| 4,187,877 A | 2/1980 | Hodgson et al. | |
| 4,245,671 A * | 1/1981 | Kosugui | F15B 13/0431 |
| | | | 137/625.6 |
| 4,340,302 A | 7/1982 | Oku | |
| 4,622,133 A | 11/1986 | Furuno | |
| 6,315,886 B1 | 11/2001 | Zappi et al. | |
| 2006/0137986 A1 | 6/2006 | Holmes et al. | |
| 2007/0108056 A1 | 5/2007 | Nyberg et al. | |
| 2013/0105014 A1* | 5/2013 | Brooks | F15B 13/0402 |
| | | | 137/625.6 |
| 2013/0105322 A1 | 5/2013 | Averbeck et al. | |
| 2013/0256135 A1 | 10/2013 | Jha et al. | |

FOREIGN PATENT DOCUMENTS

| | | |
|---|---|---|
| CN | 201028050 Y | 2/2008 |
| CN | 101978154 A | 2/2011 |
| CN | 102734546 A | 10/2012 |
| CN | 103591282 A | 2/2014 |
| DE | 2517678 A1 | 10/1975 |
| JP | 2011-163466 A | 8/2011 |

* cited by examiner

FIG. 4b

MULTI-PORT FLOW SWITCHING VALVE

CROSS-REFERENCE TO RELATED APPLICATIONS

This application is the U.S. National Phase Application under 35 U.S.C. §371 of International (PCT) Patent Application Serial No. PCT/US2015/019946, filed Mar. 11, 2015, which claims priority under 35 U.S.C. §119(e) to U.S. Provisional Patent Application Ser. No. 61/952,304, filed Mar. 13, 2014, the disclosures of which are hereby incorporated herein by reference in their entireties.

BACKGROUND

Technical Field

The technical field relates generally to a valve assembly for controlling fluid flow, and more specifically, to a valve assembly configured to define one or more fluid flowpaths within an electrochemical water treatment system.

Background Discussion

Water that contains hardness species such as calcium and magnesium may be undesirable for some uses in industrial, commercial and household applications. The typical guidelines for a classification of water hardness are: zero to 60 milligrams per liter (mg/l) of calcium carbonate is classified as soft; 61 to 120 mg/l as moderately hard; 121 to 180 mg/l as hard; and more than 180 mg/l as very hard.

Hard water can be softened or treated by removing the hardness ion species. Examples of systems that remove such species include those that use ion exchange beds. In such systems, the hardness ions become ionically bound to oppositely charged ionic species that are mixed on the surface of the ion exchange resin. The ion exchange resin eventually becomes saturated with ionically bound hardness ion species and must be regenerated. Regeneration typically involves replacing the bound hardness species with more soluble ionic species, such as sodium chloride. The hardness species bound on the ion exchange resin are replaced by the sodium ions and the ion exchange resins are ready again for a subsequent water softening step.

Electrodeionization (EDI) can be used to soften water. EDI is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices can include media having permanent or temporary charge and can be operated to cause electrochemical reactions designed to achieve or enhance performance. These devices also include electrically active membranes such as semipermeable ion exchange or bipolar membranes.

Continuous electrodeionization (CEDI) is a process that relies on ion transport through electrically active media (electroactive media). A typical CEDI device includes alternating electroactive semi-permeable anion and cation selective membranes. The spaces between the membranes are configured to create liquid flow compartments with inlets and outlets. A transverse DC electrical field is imposed by an external power source through electrodes at the bounds of the compartments. In some configurations, electrode compartments are provided so that reaction product from the electrodes can be separated from the other flow compartments. Upon imposition of the electric field, ions in the liquid to be treated in one compartment, the ion-depleting compartments, are attracted to their respective attracting electrodes. The ions migrate through the selectively permeable membranes into the adjoining compartments so that the liquid in the adjoining ion-concentrating compartments become ionically concentrated. The volume within the depleting compartments and, in some embodiments, within the concentrating compartments, includes electrically active or electroactive media. In CEDI devices, the electroactive media may include intimately mixed anion and cation exchange resins. Such electroactive media typically enhances the transport of ions within the compartments and may participate as a substrate for controlled electrochemical reactions.

SUMMARY

One or more aspects of the present disclosure involve embodiments directed toward a valve assembly for controlling fluid flow. The valve assembly can comprise a housing comprising a first chamber and a second chamber, an actuator assembly configured to move between a first position and a second position within the first and second chambers, a plurality of fluid ports in fluid communication with the first chamber, a plurality of fluid ports in fluid communication with the second chamber, wherein the first position of the actuator assembly defines a first series of fluid flowpaths through the plurality of fluid ports of the first chamber and through the plurality of fluid ports of the second chamber, and the second position of the actuator assembly defines a second series of fluid flowpaths through the plurality of fluid ports of the first chamber and through the plurality of fluid ports of the second chamber.

According to one or more further aspects the plurality of fluid ports in communication with the first chamber further comprise a plurality of fluid inlet ports and a plurality of fluid outlet ports, the plurality of fluid ports in communication with the second chamber further comprise a plurality of fluid inlet ports and a plurality of fluid outlet ports, and the first position of the actuator assembly defines a first set of pairings between the fluid inlet ports and the fluid outlet ports, and the second position of the actuator assembly defines a second set of pairings between the fluid inlet ports and the fluid outlet ports.

According to one or more further aspects, the first set of pairings in fluid communication with the first chamber includes a first fluid inlet port in fluid communication with a first fluid outlet port and a second fluid inlet port in fluid communication with a second fluid outlet port, and the second set of pairings in communication with the first chamber includes a third fluid inlet port in fluid communication with the second fluid outlet port.

According to one or more further aspects, the first set of pairings in fluid communication with the second chamber includes a first fluid inlet port in fluid communication with a first fluid outlet port and a second fluid inlet port in fluid communication with a second fluid outlet port, and the second set of pairings in fluid communication with the second chamber includes a third fluid inlet port in fluid communication with the first fluid outlet port.

According to one or more further aspects, the valve assembly further comprises an actuation chamber in communication with the first chamber and the second chamber.

According to one or more further aspects, the actuator assembly comprises a stem having a first portion extending into the first chamber and a second portion extending into the second chamber.

According to one or more further aspects, the first chamber comprises a stepped wall configuration having an expanding diameter and the second chamber comprises a stepped wall configuration having an expanding diameter.

According to one or more further aspects, at least one fluid port in fluid communication with the first chamber has a different diameter than the other fluid ports in fluid communication with the first chamber, and at least one fluid port in fluid communication with the second chamber has a different diameter than the other fluid ports in fluid communication with the second chamber.

One or more aspects of the present disclosure involve embodiments directed to a treatment system. The treatment system can comprise: an electrochemical device comprising a first compartment and a second compartment, a valve assembly configured to operate in a first position and a second position, a first series of fluid flowpaths in fluid communication with the valve assembly and at least one of the first compartment and the second compartment of the electrochemical device when the valve assembly is configured in the first position, and a second series of fluid flowpaths in fluid communication with the valve assembly and at least one of the first compartment and the second compartment of the electrochemical device when the valve assembly is configured in the second position.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 4b is a second flow diagram of fluid flowpaths through the valve assembly of FIG. 3;

DETAILED DESCRIPTION

Figure 1:
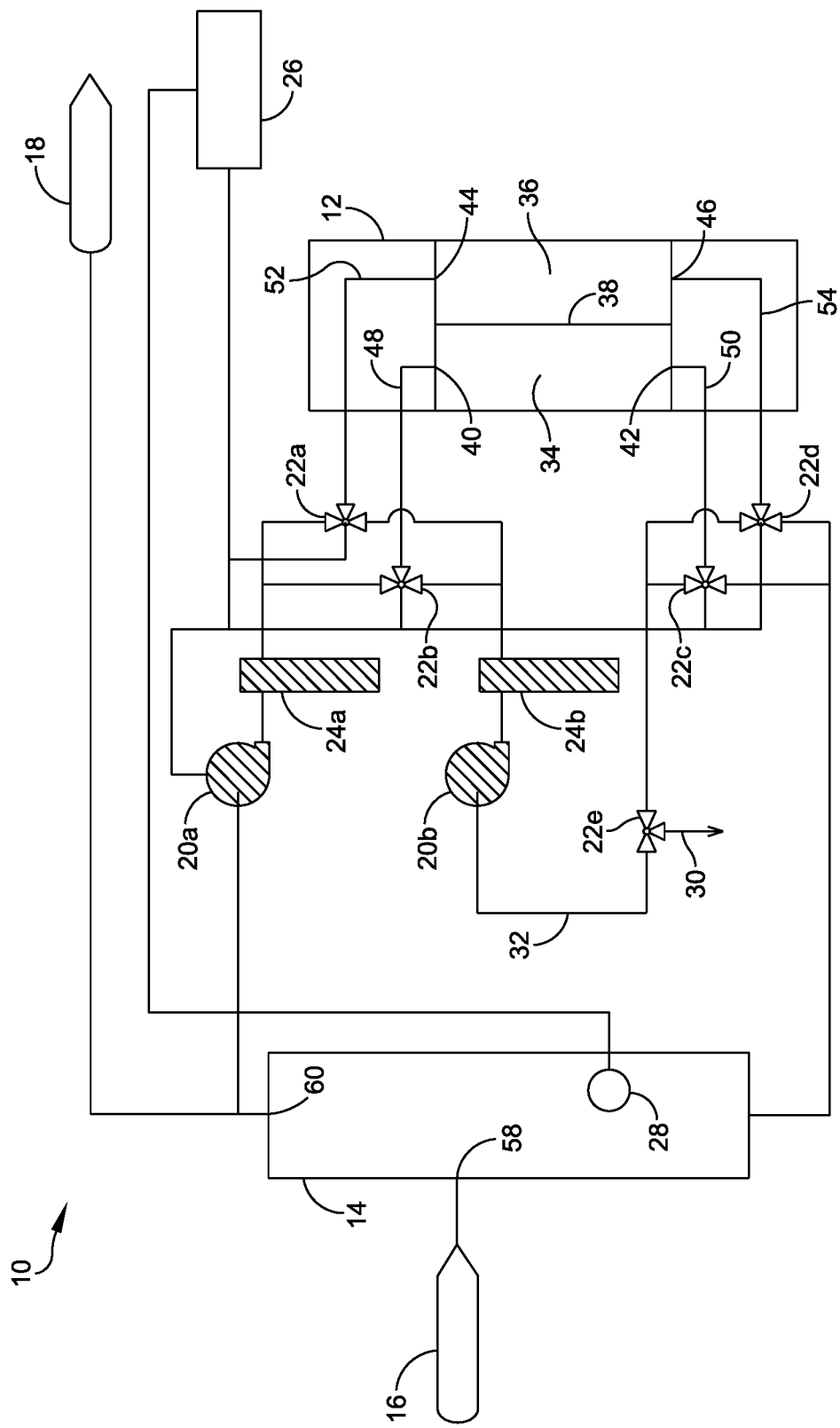
FIG. 1 is a schematic flow diagram of a treatment system with an electrochemical device according to one example.

In accordance with one or more embodiments, a valve assembly for controlling fluid flow is provided. The valve assembly may be used in a water treatment system that includes at least one EDI device and may be configured to control one or more fluid flowpaths through the body of the valve. In certain embodiments, the valve assembly may be used to replace at least two other valves or valve assemblies. The valve assembly may reduce the number of valves needed for a treatment system, and therefore decrease capital costs associated with the system. In addition, the valve assembly may be more efficient than preexisting valves and may therefore reduce energy consumption associated with the system.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

One or more aspects of the disclosure are directed to a water purification or treatment system and method that is configured to provide treated water in industrial, commercial and residential applications. The treatment system provides treated water or, in some cases, softened water, to a point of use by removing at least a portion of any undesirable species such as hardness-causing species contained in water from a water source, such as municipal water, well water, brackish water and other water sources. The treatment system can be operated to reduce the likelihood of formation of any scale or foulants that are typically generated while producing treated water. The formation of scale or foulants in the treatment system, including its components, such as any pumps, valves and lines, may be inhibited by reversing or substituting the flowing liquid from one having a high tendency to form scale to a liquid having a low or no tendency to produce scale, such as a water having a low Langelier Saturation Index (LSI). LSI can be calculated according to, for example, ASTM D 3739.

The treatment system may receive water from the water source or a point of entry and purifies the water that may contain undesirable species. The treatment system also provides or delivers the treated water to a point of use, typically through a water distribution system. The treatment system may include a reservoir system in line with an electrochemical device such as an electrodeionization device. The treatment system, in some embodiments, also comprises a sensor for measuring at least one property of the water or an operating condition of the system. In accordance with other embodiments, the treatment system may also include a controller for adjusting or regulating at least one operating parameter of the treatment system or a component of the treatment system such as, but not limited to, actuating valves, energizing pumps or other components of the system.

FIG. 1 is a schematic flow diagram of a treatment system according to one or more embodiments. The treatment system 10 may include an electrodeionization device 12 fluidly connected to a reservoir system 14, which may be fluidly connected to a water source or a point of entry 16. Treatment system 10 may include a point of use 18, which may be fluidly connected to reservoir system 14. According to some embodiments, treatment system 10 may include pumps 20a and 20b, which may be used to pump liquid from reservoir system 14 and, in some cases, circulate a liquid from an outlet to an inlet of electrodeionization device 12 through a circulation line 32. In certain embodiments, treatment system 10 may include valves 22a, 22b, 22c and 22d that may be used to direct flow to and from electrodeionization device 12 and to and from reservoir system 14, as well as through pumps 20a, 20b and a pretreatment filter 24a and 24b. In the figures, not all the valves have been illustrated for purposes of clarity; for example, a valve controlling flow of a stream to drain 30 is not shown. In a further embodiment, treatment system 10 may include a control system, which may include a controller 26, as well as a sensor 28. Sensor 28 may measure an operating parameter or a property of any one or more of the flowing fluids in treatment system 10. The sensor 28 may send or transmit the measured parameter to control system 26.

According to some embodiments, control system 26 may actuate any valve to direct the flow of liquid in the water purification. In some cases, control system 26 may energize the motors of the pumps in the treatment system. Thus, control system 26 may monitor and control the operation of the treatment system.

Electrodeionization module or device 12 may include ion-depleting (depleting) compartments and ion-concentrating (concentrating) compartments. Adjacent compartments may have an ion-selected membrane positioned therebetween. The assembly of concentrating and depleting compartments, which may be named the stack, may be in alternating order or in any of various arrangements necessary to satisfy design and performance requirements. The stack arrangement may be bordered by an electrode compartment at one end and another electrode compartment at an opposite end. The end blocks may be positioned adjacent to end plates housing an anode and a cathode in respective electrode compartments. The concentrating and depleting compartments may be defined by spacers or structures that offset and support ion selective membranes or selectively permeable membranes. The spacer, along with the selective membrane bonded thereon, define a cavity which may serve as a concentrating or a depleting compartment, depending on operating conditions as explained below.

The concentrating and depleting compartments may be filled with cation exchange resins or anion exchange resins or a mixture of both. The cation and anion exchange resins can be arranged as mixtures or as layers within any of the depleting, concentrating and electrode compartments so that a number of layers in a variety of arrangements can be assembled. The use of mixed bed ion exchange resins in any of the depleting, concentrating and electrode compartments may include the use of inert resin between layers of beds of anionic and cationic exchange resins, as well as the use of various types of anionic and cationic exchange resins.

In operation, a liquid to be treated, typically from an upstream water source entering the treatment system 10 at point of entry 16, having dissolved cationic and anionic species, including hardness ion species, may be introduced into reservoir system 14. Liquid to be treated may then be treated or demineralized in electrodeionization device 12 as described below. The produced treated liquid may then be transferred and stored in reservoir system 14. Treated liquid in reservoir system 14, or at least a portion thereof, may be transferred to point of use 18 through a connected water distribution system (not shown).

Liquid to be treated may enter electrodeionization device or stack 12 in a depleting compartment of electrodeionization device 12. An electric field may be applied across the stack through the electrodes. The applied electric field creates a potential that attracts cationic and anionic species to their respective electrodes. In this way, the cationic and anionic species migrate toward their respective attracting electrodes from the depleting compartment to adjacent compartments, which, in some embodiments, are concentrating compartments. Selectively permeable membranes between compartments may serve as barriers that prevent further migration of ionic species into the next compartment. Thus, the ionic species from a liquid flowing in a depleting compartment may be trapped in an adjacent or nearby concentrating compartment, thereby creating a treated liquid exiting the former compartment and a concentrate stream exiting the latter compartment. Representative suitable ion-selective membranes include, for example, web supported using styrene-divinyl benzene with sulphonic acid or quaternary ammonium functional groups, web supported using styrene-divinyl benzene in a polyvinylidene fluoride binder, and unsupported-sulfonated styrene and quarternized vinyl benzyl amine grafts on polyethylene sheet.

In some embodiments of the present invention, the applied electric field may create a polarization phenomenon, which may lead to the dissociation of water, especially when water is used as liquid to be treated, into hydroxyl and hydrogen ions. The hydroxyl and hydrogen ions can regenerate the ion exchange resins in the depleting and concentrating compartments so that removal of the dissolved ionic species can occur under substantially ionically neutral conditions and may be performed continuously and without a separate step for regeneration of exhausted ion exchange resins.

The electric field may be a direct current applied through the electrode deionization device 12. However, any applied electric current that can create a bias or a potential difference between one electrode and another may be used to promote the migration of ionic species. Therefore, an alternating current may be used, provided that there is a potential difference between electrodes that is sufficient to attract cationic and anionic species to their respective attracting electrodes. For example, an alternating current may be rectified, such as with a diode or a bridge rectifier, to convert the alternating current to a pulsating current having sufficient potential to attract charged ionic species.

The electroactive media, such as cationic and anionic exchange resins, utilized in the depleting compartment and, in some cases, in the concentrating compartment, may have a variety of functional groups on their surface regions, including, but not limited to, tertiary alkyl amino groups and dimethyl ethanolamine. These may also be used in combination with other ion exchange resin materials having various functional groups such as, but not limited to quaternary ammonium groups. As recognized by one of ordinary skill in the art, other modifications and equivalents are within the scope of this disclosure. For example, the use of layered beds of ion exchange resin within any of the depleting, concentrating, and electronic compartments may be used.

Reservoir system 14 may serve to store or accumulate liquid from point of entry 16 and may also serve to store treated liquid from electrodeionization device 12. Reservoir system 14 may also provide treated water or at least partially treated water, to point of use 18. In some embodiments, reservoir system 14 comprises a vessel, such as a pressurized vessel, that includes inlets and outlets for fluid flow. As used herein, pressurized refers to any unit operation that has a differential pressure that is greater than about 2 psi. Accordingly, a pressurized vessel is a vessel that has a differential pressure, for example, through its wall that is greater than about 2 psi.

In accordance with another embodiment, reservoir system 14 may include a plurality of vessels or reservoirs. Each vessel may have several inlets positioned at various locations on each vessel. Each vessel may have one or more outlets, which may be positioned at various locations depending on, among other things, demand or flow rate to point of use 18, capacity or efficiency of electrodeionization device 12, and capacity or hold up of the reservoir system. Reservoir system 14 may further include various components or elements that perform desirable functions or avoid undesirable consequences. For example, reservoir system 12 may have vessels with internal components, such as baffles, that are positioned to minimize any internal flow currents. In some cases, reservoir system 14 may have auxiliary or external components, including, but not limited to, pressure release valves designed to relieve undesirable internal pressure and avoid or at least reduce the likelihood of rupture. Further, reservoir system 12 may have vessels with expansion systems that can accommodate volumetric changes associated with temperature changes, for example, a thermal expansion tank that is designed for maintaining a desired operating pressure. The size and capacity of such a thermal expansion tank may depend on several factors including, but not limited to, the total volume of water, the operating temperature and pressure of the reservoir system.

In accordance with another embodiment, treatment system 10 may include a circulation line that fluidly connects at least one outlet of electrodeionization device 12. For example, circulation line 32 may connect to a manifold outlet (not shown), which collects liquid exiting one or more compartments, including depleting or concentrating compartments. Circulation line 32 may also be connected to an inlet of electrodeionization device 12 through, as illustrated in FIG. 1, pump 20b and valves 22a and 22b.

Electrodeionization device 12 may also include one or more electrodeionization stages. In each stage, a stack of depleting and concentrating compartments may be positioned between first and second electrodes. Each stage of electrodeionization device 12 may include a plurality of compartments, where each compartment is defined, in part, by exterior membranes at either end thereof. A membrane of at least one compartment may co-extensively contact a membrane of an adjacent compartment; and in certain instances, all the compartments in the stack may be arranged to be adjacent to each other with membranes of adjacent compartment in co-extensive contact with each other.

As illustrated in the embodiment of FIG. 1, electrodeionization device 12 may include a first compartment 34 and an adjacent compartment 36. The first compartment 34 and the second compartment 36 may be separated by an ion selective membrane 38 positioned therebetween. According to one embodiment, first compartment 34 may function as a depleting compartment and second compartment 36 may function as a concentrating compartment. Notably, electrodeionization device 12 is schematically illustrated with a single depleting compartment and a single concentrating compartment; it is shown as such for illustration only. Thus, according to one embodiment, a plurality of depleting compartments and a single concentrating compartment, which may define a stage, may be arranged between electrodes of the electrodeionization device.

First compartment 34 may include a first port 40 and a second port 42. Similarly, second compartment 36 may include a first port 44 and a second port 46. In accordance some embodiments, first port 40 and second port 42 may be positioned at opposite ends of first compartment 34 and first port 44 and second port 46 may be positioned at opposite ends of second compartment 36. First ports 40 and 44 may serve as liquid entrances into their respective compartments. Correspondingly, second ports 42 and 46 may serve as liquid exits of their respective compartments.

In accordance with another embodiment, electrodeionization device 12 may comprise a plurality of first and second compartments. Each of the first compartments may include a first port and a second port. The plurality of first ports may be commonly fluidly connected to a first port manifold 48 and the plurality of second ports may be commonly fluidly connected to a second port manifold 50. Similarly, each of the second compartments may include a first port and a second port. The plurality of second compartment first ports may be commonly fluidly connected to a first port manifold 52 and the plurality of second compartment second ports may be commonly fluidly connected to a second port manifold 54.

First compartment 34 and second compartment 36 may be connected to a liquid circuit network having a plurality of fluid pathways or circuits defined by conduits, manifolds and valves. In one embodiment, shown in FIG. 1, a first liquid circuit may include fluid connections from reservoir system 14 to either of first compartment 34 or second compartment 36, through pump 20a, filter 24a, valves 22a and 22b and manifolds 48 and 52. The first fluid circuit may further include fluid connections from first compartment 34 and second compartment 36 to reservoir system 14, through manifolds 50 and 54 and valves 22c and 22d. In another embodiment, treatment system 10 may include a second liquid circuit through first compartment 34 or second compartment 36 and circulation line 32. In some cases, the second fluid circuit may fluidly connect circulation line 32 to first compartment 34 or second compartment 36 through pump 20b, filter 24b and any of valves 22a or 22b. The second fluid circuit may further include fluid connections through manifolds 48 and 52. Moreover, the second liquid circuit may further include fluid connections through manifold 50 or manifold 54 to any of valves 22c and 22d.

As used herein, the term "liquid circuit" is intended to define a particular connection and arrangement of valves and lines that allows a liquid stream to flow therein.

According to some embodiments, reservoir system 14 may include a pressurized vessel or a vessel that has inlets and outlets for fluid flow such as an inlet 58 and an outlet 60. Inlet 58 may be fluidly connected to point of entry 16 and outlet 60 may be fluidly connected to a water distribution system or a point of use 18. Reservoir system 14 may include several vessels, and each vessel may have several inlets positioned at various locations. In accordance with some embodiments, reservoir system 14 may include a heat exchanger for heating or cooling the fluid. For example, reservoir system 14 may include a vessel with a heating coil, which can have a heating fluid at an elevated temperature relative to the temperature of the fluid in the vessel. The heating fluid may be hot water in closed-loop flow with a heating unit operation such as a furnace so that the heating fluid temperature is raised in the furnace. The heating fluid, in turn, may raise the vessel fluid temperature by heat transfer.

In operation, reservoir system 14 may be positioned downstream of point of entry 16 and fluidly connected in-line, such as in a circulation loop, with an electrochemical device 12 such as an electrodeionization device. For example, water from point of entry 16 may flow into inlet 58 and may mix with the bulk water contained within reservoir system 14. Bulk water may exit reservoir system 14 through outlet 60 and may be directed to point of use 18 or through pumps 20a and 20b into electrochemical device 12 for purification or removal of any undesirable species. Treated water leaving electrochemical device 12 may mix with water from point of entry 16 and enter reservoir system 14 through inlet 60. In this way, a loop may be formed between reservoir system 14 and electrodeionization device 12, and feedwater from point of entry 16 may replenish water demand created by and flowing to point of use 18.

The electrochemical device may include any treatment apparatus or system that purifies or treats a fluid, such as water, by removing, at least partially, any undesirable species, such as hardness-causing species. Examples of such electrochemical devices include electrodeionization devices, electrodialysis devices and capacitive deionization devices. As recognized by one of ordinary skill in the art, the systems and techniques disclosed herein may utilize other treatment apparatuses or systems. For example, the treatment system may utilize a reverse osmosis apparatus as a treatment device.

Point of entry 16 may provide or connects water from a water source to the treatment system 10. The water source may be a potable water source, such as municipal water source or well water, or it may be a non-potable water source, such as a brackish or salt-water source. In such instances, an intermediate purification or treatment system may purify the water for human consumption before it reaches point of entry 16. The water may contain dissolved salts or ionic or ionizable species including sodium, chloride, chlorine, calcium ions, magnesium ions, carbonates, sulfates or other insoluble or semi-soluble species or dissolved gases, such as silica and carbon dioxide. Moreover, the water may contain additives such as fluoride, chlorate and bromate.

In some embodiments, treatment system 10 may include a water distribution system that may connect to a point of use. The water distribution system may include components that are fluidly connected to provide water, such as treated water, from reservoir system 14 to point of use 18. The water distribution system may comprise any arrangement of pipes, valves, tees, pumps and manifolds to provide water from reservoir system 14 to one or more points of use 18, or to any component of treatment system 10. In one embodiment, the water distribution system comprises a household or residential water distribution network including, but not limited to, connections to a sink faucet, a shower head, a washing machine and a dishwasher. For example, system 10 may be connected to the cold or hot, or both, water distribution system of a household.

In accordance with another embodiment, treatment system 10 may also include a sensor 28, such as a water property sensor, which measures at least one physical property in treatment system 10. For example, sensor 28 may be a device that can measure turbidity, alkalinity, water conductivity, pH, temperature, pressure, composition, total dissolved solids (TDS), or flow rate. Sensor 28 may be installed or positioned within treatment system 10 to measure a particularly preferred water property. For example, sensor 28 may be a water conductivity sensor installed in reservoir system 14 that measures the conductivity of the stored water, which may be an indication of the quality of the water available for service in point of use 18. In another embodiment, sensor 28 may comprise a series or a set of sensors. The set of sensors may be constructed, arranged or connected to controller 26 so that controller 26 can monitor, intermittently or continuously, the quality of water. In such an arrangement, the performance of treatment system 10 may be optimized as described below. Other embodiments may include a combination of sets of sensors in various locations throughout treatment system 10. For example, sensor 28 may be a flow sensor measuring a flow rate to a point of use 18 and may further include any of a nephelometer, pH, composition, temperature and pressure sensor monitoring the operating condition of treatment system 10.

In accordance with some embodiments, treatment system 10 may further include a pretreatment system 24 designed to remove a portion of any undesirable species from the water before the water is introduced to, for example, reservoir system 14 or the treatment device, e.g., the electrochemical device. Examples of pretreatment systems include, but are not limited to, reverse osmosis devices, which may be used to desalinate brackish or salt water. In certain instances, a carbon or charcoal filter may be included to remove at least a portion of any chlorine or any species that may foul or interfere with the operation of electrochemical device.

According to some embodiments, pretreatment system 24 may be positioned anywhere within treatment system 10. For example, pretreatment system 24 may be positioned upstream of reservoir system 14 or downstream of reservoir system 14 but upstream of electrodeionization device 12 so that at least some chlorine species are retained in reservoir system 14 but are removed before liquid enters electrodeionization device 12. Pretreatment system 24 may include a filter or an arrangement of filters. As shown in FIG. 1, pretreatment system 24 may include filters 24a and 24b upstream of compartments 34 and 36. In other cases, pretreatment system 24 may include a filter upstream of reservoir system 14 as well as filters 24a and 24b between pumps 20a and 20b and compartments 36 and 34. Filters 24a and 24b may be any of a particulate, carbon, iron filter or combinations thereof.

In accordance with other embodiments, the treatment system may further include pre or post treatment apparatus or systems disposed in any part thereof to allow decontamination or inactivation of any microorganisms such as bacteria that may accumulate in any component of the treatment system. For example, a pretreatment apparatus may be fluidly connected to a distribution system of the treatment system. In other embodiments, a post treatment device may treat fluid prior to being delivered to a point of use. Examples of such apparatus or systems that can destroy or inactivate microorganisms include those that provide actinic radiation, or ultraviolet radiation, and/or ozone. Other examples of such devices include those that remove bacteria by ultrafiltration or microfiltration. In accordance with other embodiments, the treatment system may further include one or more chemical delivery systems that disinfect one or more components of the treatment system. For example, a chemical treatment system may be fluidly connected to any component of the treatment system to deliver a chemical that destroys or renders any bacteria inactive. Examples of such chemicals include, but are not limited to, acids, bases or other disinfecting compounds such as alcohols. In further embodiments, a hot water disinfecting apparatus may be fluidly connected to the treatment system. The hot water disinfecting system may provide hot water that destroys or inactivates any bacteria that may accumulate in any component of the treatment system.

According to some embodiments, treatment system 10 may further include a controller 26 that is capable of monitoring and regulating the operating conditions of treatment system 10, including its components. Controller 26 may be a microprocessor-based device, such as a programmable logic controller (PLC) or a distributed control system, that receives or sends input and output signals to and from components of treatment system 10. In one embodiment, controller 26 may be a PLC that sends a signal to power source (not shown), which supplies power to electrodeionization device 12 or a signal to a motor control center that energizes the motors of pumps 20a and 20b. In certain embodiments, controller 26 may regulate the operating conditions of treatment system 10 in open-loop or closed-loop control scheme. For example, controller 26, in open-loop control, may provide signals to the treatment system such that water is treated without measuring any operating condition. In contrast, controller 26 may control the operating conditions in closed-loop control so that operating parameters may be adjusted depending on an operating condition measured by, for example, sensor 28. In yet another embodiment, controller 26 may further include a communication system such as a remote communication device for transmitting or sending the measured operating condition or operating parameter to a remote station.

In accordance with some embodiments, controller 26 may provide a signal that actuates valves 22a, 22b, 22c, and 22d so that liquid flow is directed based on a variety of parameters including, but not limited to, the quality of water from point of entry 16, the quality of water to point of use 18, the demand or quantity of water to point of use 18, the operating efficiency or capacity of electrodeionization device 12, or any of a variety of operating conditions, such as turbidity, alkalinity, water conductivity, pH, composition, temperature, pressure, TDS, and flow rate. According to some embodiments, controller 26 may receive signals from sensor 28 so that controller 26 is capable of monitoring the operating parameters of treatment system 10. For example, sensor 28 may be a water conductivity sensor positioned within reservoir system 14 so that the water conductivity in reservoir system 14 may be monitored by controller 26. Controller 26 may, based on the water quality measured by sensor 28, control a power source, which may provide an electric field to electrodeionization device 12. In operation, controller 26 may increase or decrease or otherwise adjust the voltage and current supplied from power source 24 to, for example, electrodeionization device 16.

In some embodiments, adjusting an operating parameter, for example, the rate of discharge to drain 30 or the period during discharge may be a function of at least one measured parameter, such as the system operating pressure. For example, the period during which a valve (not shown), in FIG. 1, is actuated open to drain 30 may be adjusted based on the measured pressure of the liquid supplied to point of use 18. In some cases, the valve may be actuated open to reduce the measured pressure, or it may be minimally actuated, depending on the type of valve, when the measured pressure is below a predetermined value. Such a secondary control scheme may be incorporated or nested within any of the existing control loops actuating the valve described above.

In accordance with another embodiment, the valve can serve as part of a pressure control loop as well as a part of a concentrate discharge control loop. For example, the valve can be actuated by controller 26 when the measured conductivity of the concentrate stream reaches a set point. A separate pressure control loop incorporating the valve may be superimposed or nested within an existing control loop to relieve pressure in system 10. In any of the above-mentioned control schemes, the control loops may incorporate feedback, as well as any of proportional, derivative, integral, or combination thereof. In another embodiment of the invention, a control loop that directs the discharge of a concentrate stream to drain 30 may have a nested control loop parameter that depends on or factors in the pressure of liquid delivered to point of use 18 to provide a control signal.

In another embodiment, controller 26 may reverse the direction of the applied current from power source to electrodeionization device 12 according to a predetermined schedule or according to an operating condition, such as the water quality or any other operating parameter.

Controller 26 may be configured or configurable by programming or can be self-adjusting such that it is capable of maximizing any of the service life and the efficiency of or reducing the operating cost of treatment system 10. For example, controller 26 may include a microprocessor having user-selectable set points or self-adjusting set points that adjust the applied voltage and current to an electrochemical device such as an electrodeionization device, the flow rate through the concentrating and depleting compartments of the electrodeionization device, or the discharge flow rate to drain 30 from the electrodeionization device, the pretreatment system, or both. The controller may also incorporate any one or more of adaptive, self-adjusting, or self-diagnosing techniques capable of alerting or changing the operating parameters based on a variety of input conditions, such as the rate of water use or time of water use. Controller 26 may incorporate dead band control to reduce the likelihood of unstable on/off control or chattering. Dead band refers to the range of signal outputs that a sensor provides without necessarily triggering a responsive control signal. The dead band may reside intrinsically in the sensor, or may be programmed as part of the control system, or both. Dead band control may avoid unnecessary intermittent operation by smoothing out measurement excursions. Such control techniques may prolong the operating life or mean time before failure of the components of treatment system 10. Other techniques that may be used include the use of voting, time-smoothing or time-averaging measurements, or combinations thereof.

In another embodiment water from a waste stream may serve or provide additional or secondary benefits. For example, waste stream, rather than going to drain 30, may be used to provide irrigating water to any residential, commercial or industrial use, such as for irrigating, for recycling or for recovery of collected or concentrated salts.

According to various embodiments, the treatment system may include a fluid circuit that provides treated or, in some cases, softened water, to an electrode compartment of the electrochemical device. The fluid circuit may include fluid connections from a treated water source to the electrode compartments of the electrochemical device. The fluid circuit may also include a pretreatment unit, such as a carbon filter, that may remove any species, such as chlorine, which can interfere with the operation of the electrochemical device. The fluid circuit may also include fluid connections to at least one of the depleting and the concentrating compartments of, for example, the electrodeionization device, and may be positioned, for example, downstream of the pretreatment unit. The fluid circuit connections may provide connections so that fluid exiting the electrode compartments may be, for example, mixed together or mixed with fluid to be treated in the depleting compartment. The fluid circuit may also include pumps and valves that may direct fluid flow to and from the electrochemical device as well as to and from the reservoir system. In some cases, the fluid circuit may be arranged to provide fluid connections that create parallel flow paths through the electrode compartments of the electrodeionization device. Other arrangements and configurations are considered to be within the scope of the disclosure and include, for example, serial flow paths from one electrode compartment to the other, the use of single, multiple or dedicated pretreatment units as well as multiple or staged treatment units including, but not limited to, reverse osmosis, ion exchange and electrodeionization devices, or combinations thereof, in the fluid circuit.

The treatment system may include a fluid circuit that provides fluid connections from a depleting compartment to at least one electrode compartment of the electrodeionization device. Such an arrangement may provide treated water, preferably water having low LSI, to the electrode compartment. The fluid circuit may be arranged so that the fluid flow paths may be in series or in parallel through the electrode compartments. The fluid circuit may further include fluid connections to allow the fluid that would exit the electrode compartment to be delivered to a point of use via, for example, a water distribution system. In some arrangements, the fluid circuit may include fluid connections so that untreated fluid may be mixed with fluid that would exit any of electrode compartments; the mixture may be delivered to the point of use. In another embodiment, the fluid circuit may further include fluid connections to and from a reservoir system so that, for example, treated fluid that would exit the depleting compartment may be transferred to the reservoir system and mixed with untreated fluid from the point of entry and the mixture may be delivered to the point of use and, optionally, to the electrode compartments of the electrodeionization device in parallel or series flow paths. Other arrangements and combinations including, for example, the mixing of treated and untreated water to produce a mixed electrode compartment flushing fluid are considered to be within the scope of the present disclosure.

Positioned within treatment system 10 at one or more locations may be an actuating valve 22. For example, the concentrate stream leaving the electrodeionization device may be partially circulated and partially rejected to a drain 30 by actuating a valve 22e. Make-up water, from point of entry 16, may be fed into the circulating stream to compensate for any water that is rejected to drain 30.

According to one embodiment, in one flow direction, water from pressure vessel 14 may be pumped by pump 20a, through valve 22a, to pretreatment unit 24a before being introduced to the depleting compartments of electrodeionization device 12. Treated water from electrodeionization device 12 may be directed by valve 22a to storage in pressure vessel 14. Fluid that collects removed ionic species may be circulated by pump 20b through pretreatment unit 24b and the concentrating and electrode compartments of electrodeionization device 12 by activating valves 22d and 22b. When the polarity of the applied electric field is reversed, the flow directions may be correspondingly adjusted so that pump 20a, pretreatment unit 24a, and valve 22a circulate the liquid accumulating ionic species. Similarly, water to be treated may be pumped from pressure vessel 14 using pump 20b through valve 22d to pretreatment unit 24b before being introduced and treated in the depleting compartments of electrodeionization device 12. Treated water may also be directed by valve 22d to pressure vessel 14.

Figure 2:
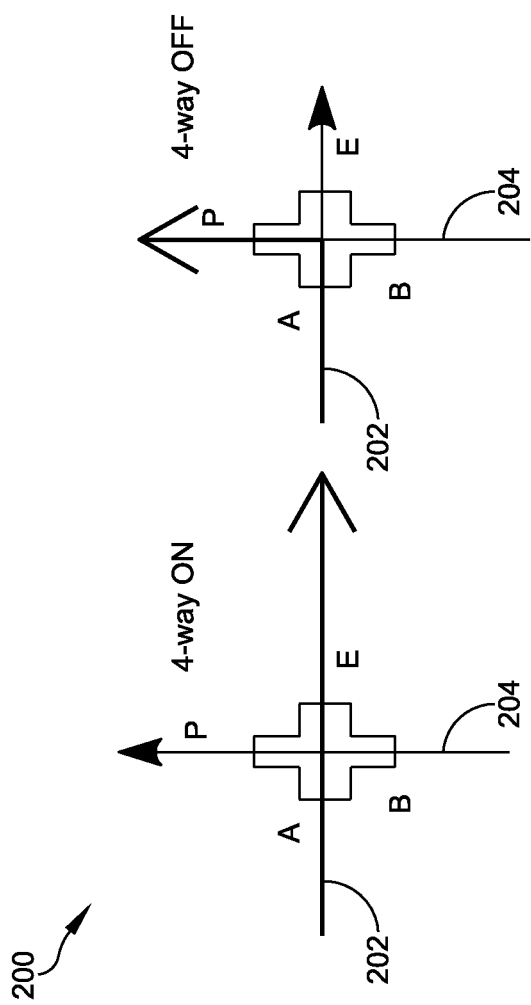
FIG. 2 is a flow diagram showing the functionality of a 4-way valve in a first position (left) and a second position (right)

One or more of valves 22a-22d included in treatment system 10 may be combined or constructed to include the functionality provided by a 4-way valve, such as the valve illustrated in FIG. 2. According to some embodiments, valve 200 may be a 4-way solenoid valve. The valve 200 is configured to accommodate for stream switching within the treatment system. To accomplish this, the valve 200 is configured with two inlets (A and B) and two outlets (E and P). As shown, the valve 200 in a first position (left) is configured to allow for a pair of fluid flowpaths (202 and 204) through the valve. Fluid flowpath 202 travels through inlet A to outlet E and fluid flowpath 204 travels through inlet B to outlet P. When the valve 200 is in a second position (right) fluid flows through the valve in a different configuration than the first position. In the second position, fluid flowpath 202 travels through inlet A to outlet P and fluid flowpath 204 travels through inlet B to outlet E. The pairing of a particular inlet to an outlet is switched between the first position and the second position, meaning that the outlet associated with a particular inlet is switched from the first position to the second position.

In one embodiment, the first position of the valve 200 may be associated with a first liquid circuit within the treatment system, and the second position may be associated with a second liquid circuit. In other embodiments, the first position of the valve 200 may define two flowpaths, where each fluid flowpath is in fluid communication with either the depletion compartment or the concentrating compartment of an EDI device. When the valve 200 is placed in the second position, the flowpaths may be reversed. The 4-way valve 200 is therefore able to interchange two different fluid flowpaths, allowing for a depletion stream in communication with a depletion compartment of an EDI device to become a concentrating stream in communication with a concentrating compartment of an EDI device.

In accordance with one or more embodiments, two or more of the single 4-way valve illustrated in FIG. 2 may be combined to form a single 8-way valve. For example, a single 8-way spool valve may be used to replace two 4-way solenoid valves. The 8-way valve may offer several advantages over the use of two single 4-way valves. For example, the single valve may be more compact than two separate valves. This may be accomplished, for example, by using a single actuator and may therefore reduce costs associated with constructing and maintaining the valve and any piping or infrastructure associated with the valve. Further, the valve may use less power than two single valves, thereby increasing efficiency of the valve and the overall system. The life of the valve may also be extended. This may be accomplished by reducing the amount of water or other fluid that may be present in a solenoid coil and that may cause rusting and scaling. The valve may also offers flexibility in its design. For instance, the valve may be assembled from two valves that are arranged head-to-head, tail-to-tail, or head-to-tail using a single actuator. The valve may also be configured to provide a flow coefficient ($C_v$) of from about 0.25 to about 2.0. In at least one embodiment, the flow coefficient $C_v$ may be a value of 1.0 or higher. The valve may also be configured to allow for stream switching within the treatment system.

Figure 3:
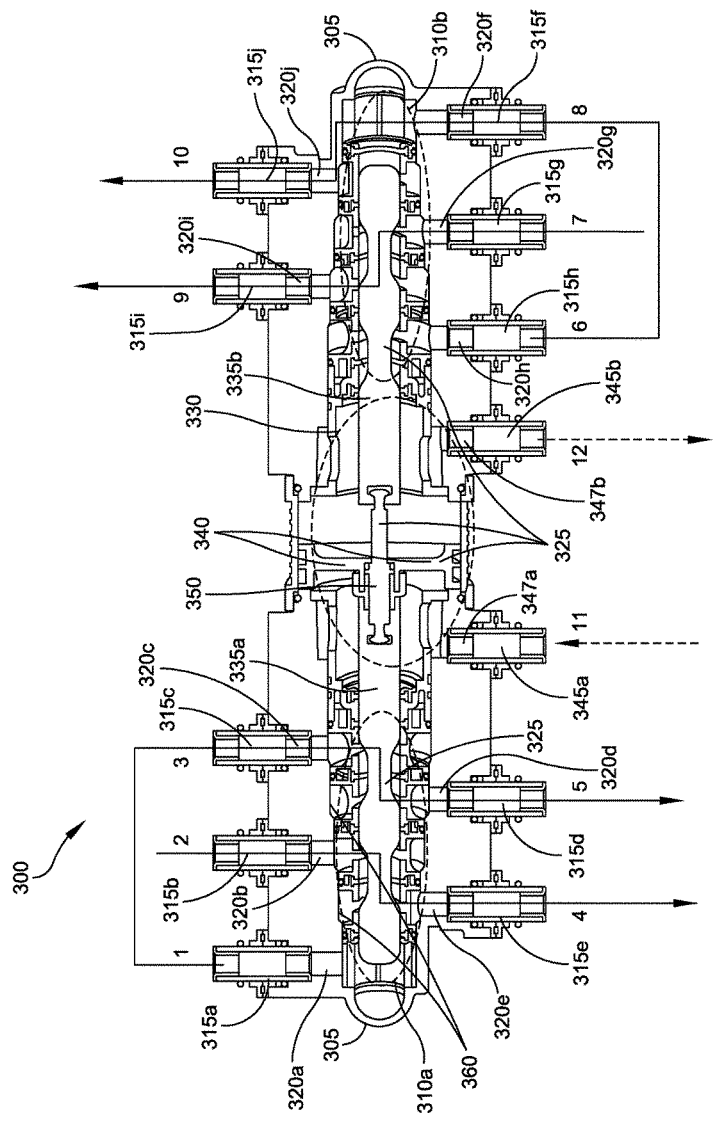
FIG. 3 is a sectional side view of a valve assembly according to one example.

FIG. 3 is a sectional side view of a valve assembly 300 according to one or more embodiments. According to certain aspects, the valve assembly 300 may function as an 8-way valve. The valve assembly 300 may include a housing 305 comprising a first chamber 310a and a second chamber 310b. The housing 305 may be generally cylindrical in shape and may be constructed from one or more materials that allow for fluid-tight fittings, such as metal, metal alloy, or polymer materials. For example, the housing may be constructed from stainless steel or NSF approved plastic material. The housing 305 may be constructed from one or more manufacturing techniques, including the use of stamped, machined, casted, or molded manufacturing techniques. In some embodiments, the housing 305 may be constructed from two separate pieces that may be connected in the middle by one or more components of an actuator assembly 325, discussed further below.

The first chamber 310a and second chamber 310b may be approximately equal in size and each may be generally cylindrical in shape. Each of the first chamber 310a and second chamber 310b may include a plurality of fluid ports 315 that are positioned through at least a portion of an external surface of the housing 305. For example, first chamber 310a may include five fluid ports 315a-315e and second chamber 310b may include five fluid ports 315f-315j. Further, as discussed further below in reference to FIGS. 4a and 4b, the fluid ports 315 may function as inlet ports or outlet ports for one or more fluid flowpaths moving through the valve assembly 300. For example, one or more of fluid ports 315a-315c may function as inlet ports, and one or both of fluid ports 315d and 315e may function as outlet ports, depending on the position of the actuator assembly 325, as discussed further below. Likewise, one or more of fluid ports 315f-315h may function as inlet ports, and one or both of fluid ports 315i and 315j may function as outlet ports, depending on the position of the actuator assembly 325. Fluid inlet ports 315a-315c may be positioned on opposite sides of the first chamber 310a than fluid outlet ports 315d and 315e, and fluid inlet ports 315f-315h may be positioned on opposite sides of the second chamber 310b. Further, inlet ports 315a-315c may be positioned on opposite sides of the housing 305 than inlet ports 315f-315h. Outlet ports 315d and 315e may be positioned on opposite sides of the housing 305 than outlet ports 315i and 315j.

As will be appreciated by one of ordinary skill in the art, any one of the fluid ports 315 may function as an inlet or an outlet port. For example, in an alternative to the arrangement discussed above, one or more of fluid ports 315a-315c may function as outlet ports, and one or both of fluid ports 315d and 315e may function as inlet ports, and one or more of fluid ports 315f-315h may function as outlet ports, and one or both of fluid ports 315i and 315j may function as inlet ports.

According to at least one embodiment, at least one fluid port of the valve assembly, such as any one or more of fluid ports 315a-315j, may function as a discharge valve, as discussed above in reference to drain 30 of FIG. 1. For example, based on any one or more operating parameters, such as turbidity, alkalinity, water conductivity, pH, temperature, pressure, TDS, incoming composition, flow rate, or time, the actuator assembly 325 may be moved to a position such that a fluid port 315 allows fluid to exit the valve assembly 300 and be discharged from the system via a drain, such as drain 30 featured in FIG. 1. In certain instances, as mentioned above, a controller may discharge a concentrate stream to drain 30, and therefore the fluid port 315 that functions as a discharge valve may be associated with a fluid flow path or may otherwise be in fluid communication with a concentrate stream.

The valve assembly 300 may also include one or more flexible connectors (not shown) that are attached to one or more of the fluid ports 315. The flexible connectors may be further attached to one or more manifolds. In certain configurations, the flexible connectors may allow for the fluid ports 315 to be closed off, thereby preventing fluid from entering or exiting the fluid port 315. The flexible connector may also allow for easy removal and installation of the valve. In certain instances, the flexible connector may also function to absorb any variation or misalignment between the ports and the manifold.

Each fluid port 315 may include an inlet 320 that allows for fluid flow into the first chamber 310a or the second chamber 310b. The inlets 320 may be constructed as part of the housing 305 and one end of the inlet 320 may be in fluid communication with the fluid port 315 and the other end may be in fluid communication with the chamber 310, depending on the position of the actuation assembly 325.

According to one or more embodiments, each of the respective inlets 320a-320e associated with respective fluid ports 315a-315e may be cylindrical in shape and have a different size diameter. For example, the diameter of inlet 320a may be larger than the diameter of inlet 320b and the diameter of inlet 320b may be larger than the diameter of inlet 320c. Likewise, each of the respective inlets 320f-320j associated with respective fluid ports 315f-315j may be cylindrical in shape and have a different diameter. In some embodiments, at least one inlet 320 associated with the first chamber 310a may have a different diameter than at least one other inlet associated with the first chamber 310a. At least one inlet 320 associated with the second chamber 310b may have a different diameter than at least one other inlet associated with the second chamber 310b. In certain embodiments, the inlets 320 associated with fluid ports 315d and 315e may have a different diameter from each other. In other embodiments, the inlets 320 associated with fluid ports 315d and 315e may have the same size diameter. Likewise, the inlets associated with fluid ports 315i and 315j may each have a different diameter size from each other, or may have the same diameter size. According to at least one embodiment, the fluid ports 315 associated with each inlet 320 may all have the same size diameter, and this size may be different than each of the inlets 320 associated with each respective fluid port 315. According to another embodiment, fluid ports 315a-315j may have the same size diameter. The diameter of the fluid ports 315 may be of any size to permit the flow of one or more process fluids through the valve assembly. In at least one embodiment, fluid ports 315a-315j may have a diameter of 0.5 inch.

The first chamber 310a and the second chamber 310b may each be configured to include a stepped wall 360 that is configured to have an expanding diameter. As illustrated in FIG. 3, a first portion of the stepped wall 360 of first chamber 310a positioned near one end of the valve assembly 300 and adjacent inlets 320a may have a smaller diameter than a second portion of the stepped wall 360 positioned adjacent inlet 320e. A third portion of the stepped wall 360 may include inlet 320b and have a diameter larger than the first and second portion. A fourth portion of the stepped wall 360 may include inlet 320d and have a diameter larger than the first, second, and third portion. A fifth portion may include inlet 320c and have a diameter larger than the first, second, third and fourth portion. Additional portions are within the scope of this disclosure, and one or ordinary skill in the art will readily recognize that fewer than four portions is also within the scope of this disclosure. The first chamber 310a may be defined by the stepped wall 360 and have an expanding diameter that is of a smaller dimension near one end of the valve assembly 300 and a larger dimension near the center of the valve assembly 300, with one or more stepped portions in between that increase in diameter. The second chamber 310b may also be defined by a stepped wall 360, with a first portion associated with inlet 320f and having a smaller diameter than a fifth portion associated with inlet 320h.

Constructing the valve assembly 300 using the stepped wall 360 may prevent damage to one or more seals associated with each fluid port 315 and inlet 320 during the manufacturing and assembly phase of the valve. For example, the intersection of each fluid port 315 and inlet 320 with the wall 360 may form an edge. As described above, one port entrance may be associated with each stepped bore size. The port entrances may be positioned near one end of their respective bore step. For example, fluid ports 315i and 315j (and inlets 320i and 320j, respectively) are positioned at the far right end of each of their respective steps, and fluid ports 315b and 315c (and inlets 320b and 320c, respectively) are positioned at the far left end of each of their respective steps. In some embodiments the fluid ports may be positioned near the smaller diameter end of their respective bore step. A seal cage may be centered around and on a fluid port 315 (and inlet 320) in the interior and along the stepped wall of the first and second chambers 310. The intersection of each seal cage with a neighboring seal cage forms a pair of o-ring seal grooves, with one groove being smaller in diameter than the other. In the installed position, the larger outer cage seal ring makes contact with the edge of the stepped bore wall of the neighboring smaller bore size. The outer cage seal ring of the smaller bore size then makes contact with the edge of the stepped bore wall of the neighboring smaller bore size, and so on. Consequently, each outer cage seal ring comes into contact with a stepped wall at the edge of the stepped bore in which it is designed to seal. This stepped bore design ensures that the outer o-ring seals of the seal cages do not get positioned over the sharp edges of the intersection between the ports and the walls of the chamber, leading to potential damage during assembly and service.

Although the valve assembly illustrated in FIG. 3 incorporates an interior with a stepped wall configuration, it is within the scope of this disclosure to include other embodiments that do not have the stepped wall configuration. For example, the wall of the interior of the valve assembly may have a linear, or smooth configuration, and may be substantially cylindrical in shape.

The valve assembly 300 may further include an actuator assembly 325. The actuator assembly 325 may include an actuation chamber 330 that is in communication with the first chamber 310a and the second chamber 310b. The actuator assembly may include a stem 335 that has a first portion 335a extending into the first chamber 310a and a second portion 335b extending into the second chamber 310b. The first portion 335a of the stem 335 may be configured to move within the first chamber 310a and selectively block or allow the flow of fluid through the first chamber 310 by blocking or allowing fluid to flow from one or more of fluid ports 320a-320c to one or more of fluid ports 320d and 320e. In a similar manner, the second portion 335b of the stem 335 may be configured to move within the second chamber 310b to selectively block or allow fluid to flow from one or more of fluid ports 315f-315h to one or more of fluid ports 315i and 315j.

The actuation assembly 325 may further include a connector 350 that connects the first portion 335a and the second portion 335b of the stem 335. As illustrated in FIG. 3, the actuation chamber 330 may be generally cylindrical in shape and defined by two opposing walls. A sliding member 340 may be positioned inside the actuation chamber 330 and extend in between the two opposing walls to form a fluid-tight connection. The sliding member 340 may be attached to the connector 350 and as discussed further below, may be configured to move between a first position and a second position within the actuation chamber 330.

The valve assembly 300 may further include one or more actuation ports 345 that are in fluid communication with the actuation chamber 330. For example, the actuation chamber 330 may comprise a first compartment that is in communication with the first chamber 310a and a second compartment that is in communication with the second chamber 310b. Further, a first actuation port 345a may be in fluid communication with the first compartment of the actuation chamber 330 and a second actuation port 345b may be in fluid communication with the second compartment of the actuation chamber. Each actuation port may be in fluid communication with a source of hydraulic fluid to allow hydraulic fluid to enter or exit the actuation chamber 330 and thereby move the sliding member 340 between the first and second position. For instance, a first actuation port 345a may be positioned on one side of the actuation chamber 330 and a second actuation port 345b may be positioned on the opposite side of the actuation chamber 330. The sliding member 340 may be positioned in between the first actuation port 345a and the second actuation port 345b such that it divides the actuation chamber 330 while moving in between the first and second position and keeps hydraulic fluid in fluid communication with the first actuation port 345a from making contact with hydraulic fluid in fluid communication with the second actuation port 345b. In some embodiments, the first actuation port 345a and the second actuation port 345b may share a common source of hydraulic fluid (not shown) and may be configured to be part of a separate hydraulic system. Actuation port 345a may function as an inlet for hydraulic fluid to enter the actuation chamber 330 when the sliding member 340 is in a first position or in the process of moving into the first position. At the same time, actuation port 345b may function as an outlet for hydraulic fluid to exit the actuation chamber 330. In the alternative, actuation port 345a may function as an outlet for hydraulic fluid to exit the actuation chamber 330 when the sliding member 340 is in a second position or in the process of moving into the second position. At the same time, actuation port 345a may function as an outlet for hydraulic fluid to exit the actuation chamber 330.

According to some embodiments, actuation ports 345a and 345b may have a different diameter than fluid ports 315a-315j. For example, actuation ports 345a and 345b may each have a diameter that is smaller than a diameter of fluid ports 315a-315j. The diameter of the actuation ports 345 may be of any size to allow one or more types of actuation fluid to flow in and out of the actuation chamber 330. In at least one example, actuation ports 345a and 345b may have a diameter of 0.25 inch and fluid ports 315a-315j may have a diameter of 0.5 inch.

Actuation ports 345a and 345b may each further include inlet portions 347a and 347b that may be constructed as part of the housing 305. The inlet portions 347 may include one or more flowpaths that direct fluid in and out of the actuation chamber 330. Further, one or more seals may be used to block fluid from entering or exiting through the inlet portions 347.

When hydraulic fluid enters actuation chamber 330 from actuation port 345b, the hydraulic fluid forces the sliding member 340 to move to a first position, such as to the left of the valve assembly 300 shown in FIG. 3. Since the sliding member is attached to the connector 350, and the connector 350 is attached to each portion of the stem 335, the movement of the sliding member 340 causes the stem 350 to move in the same direction as the sliding portion 340. As shown in FIG. 3, the position of the first portion 335a of the stem 335 allows fluid to flow from fluid port 315b through the first chamber 310a to fluid port 315e and fluid to flow from fluid port 315c through the first chamber 310a to fluid port 315d. At the same time, the flow of fluid through fluid port 315a is blocked by the stem 335a. In the second chamber 310b, the position of the second portion 335b of the stem 335 allows fluid to flow from fluid port 315g to fluid port 315i and from fluid port 315f to fluid port 315j, while blocking flow from fluid port 315h.

Figure 8:
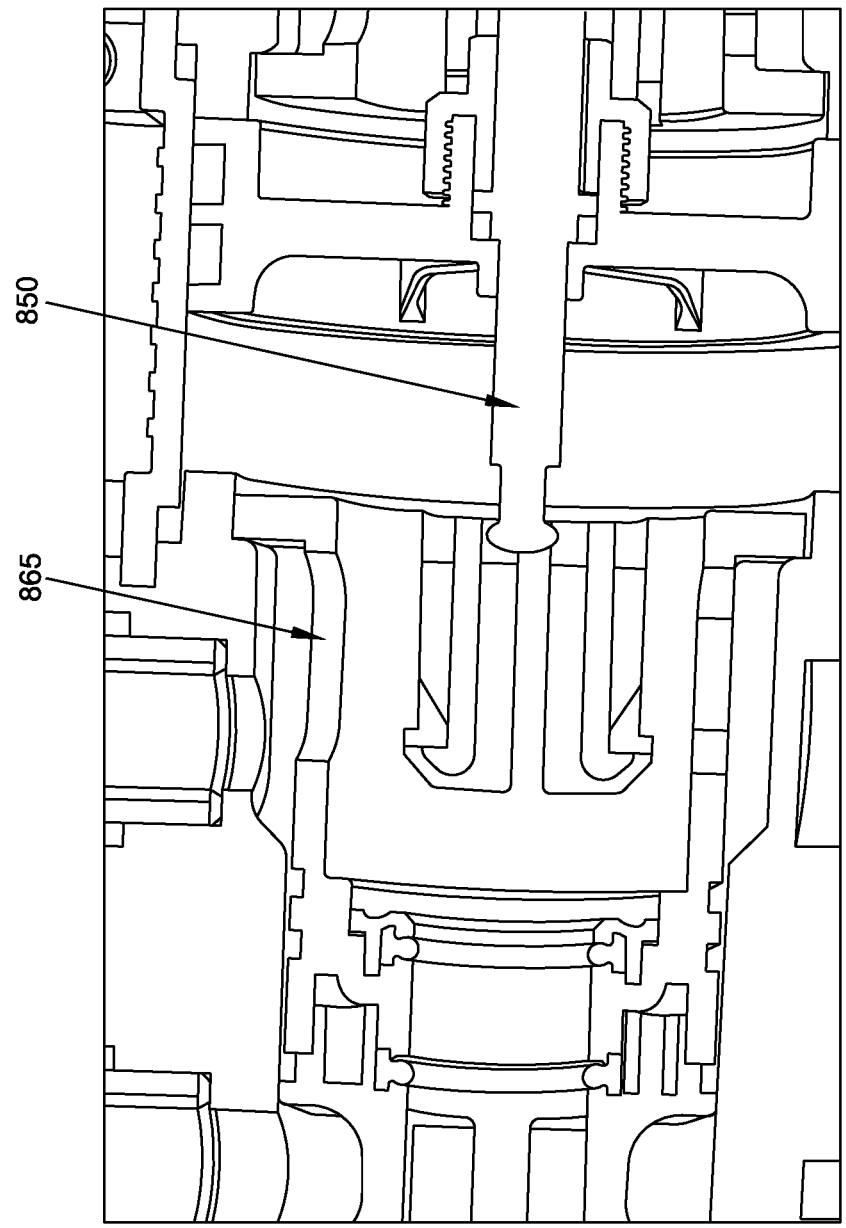
FIG. 8 is a portion of a sectional side view of a valve assembly according to one example.

According to some embodiments, one or more components of the actuator assembly 325 may be configured to join one or more sections of the housing 305. For example, the actuation chamber 330 may be positioned in between two sections of the housing 305 and may be configured to firmly attach to each section to allow for fluid-tight seals. The connector 350 of the actuator assembly 325 may function as a piston and have a male spigot formed at each end. The male spigots may be configured to engage in slots formed in drive ends of each of the stems 335. The slots formed in each end of the stems 335 may be open-ended on one side to allow the connector 350 to quickly and easily be positioned into place. Further, the slots may be configured with sufficient clearance to allow for alignment between one or more sections of the housing 305 and the actuator assembly 325. For example, as shown in FIG. 3, the left and right sections of the valve assembly 300 may be secured to the actuator assembly using U-pin type connections. FIG. 8 also illustrates a seal cage retainer 865 that functions to hold a seal cage and stem assembly on each side of the body of the valve. Also illustrated in FIG. 8 is connector 850. The seal cage retainer 865 may include one or more o-ring seals that function to isolate the fluid pathways flowing through the valve. For example, the o-ring seals may separate a depleting fluid pathway and a concentrating fluid pathway from actuation fluid flowing through actuation port 345 on each side of the connector 350 and allow for actuation fluid to flow in and out of actuation ports 345a and 345b. The seal cage retainer 865 may be held in place by hooks 870, such as plastic hooks. The hooks may be molded into the one or more outer walls of the seal cage retainer 865 and may engage with lugs that are formed on the inner walls of the valve body. This configuration allows for quick assembly of the seal cage retainer 865 into the body of the valve without the use of separate fasteners. One or more of the seal cages included in the valve assembly may include these positioning and mating features. Further, other components, such as each section of the valve assembly, the connector, and the stems may each be configured with connectors that allow for easy assembly and maintenance of the valve assembly.

Although FIG. 3 illustrates one configuration for the valve assembly 300, other arrangements are within the scope of this disclosure. For example, fluid ports 315a-315c may be positioned on the same side of the valve assembly 300 as fluid ports 315g-315h. Further, one or more additional fluid ports may be added to the assembly, depending on the design and performance specifications of the associated treatment system. The valve assembly 300 may also be configured to allow for any one or more of fluid ports 315a-315j to function as inlets, and any one or more of fluid ports 315a-315j to function as outlets. The stem 335 of the actuator assembly 325 may also be configured to block flow to and from one or more fluid ports when positioned in the first or second position. In addition, the design of the valve may be adjusted to allow for a retrofit into a preexisting treatment system. In certain embodiments, the pressure associated with moving the sliding member 330 from the first to the second position (and vice versa) may be in a range of from about 5 psi to about 500 psi.

According to at least one embodiment, at least one sensor, as discussed above, may be positioned within one or more of fluid port 315a-315j. For example, at least one sensor may be positioned within at least one of a fluid port of fluid ports 315a-315e and a fluid port of fluid ports 315f-315j. In accordance with some embodiments, the sensor may be configured to measure at least one of turbidity, alkalinity, water conductivity, pH, temperature, pressure, TDS incoming water composition, and flow rate. According to a further embodiment, one or more sensors may be positioned at one or more locations within the housing 305 of the valve assembly 300, such as in chambers 310a and 310b, actuation chamber 330, actuation ports 345a and 345b, and any other component of the actuation assembly 325.

Figure 4A:
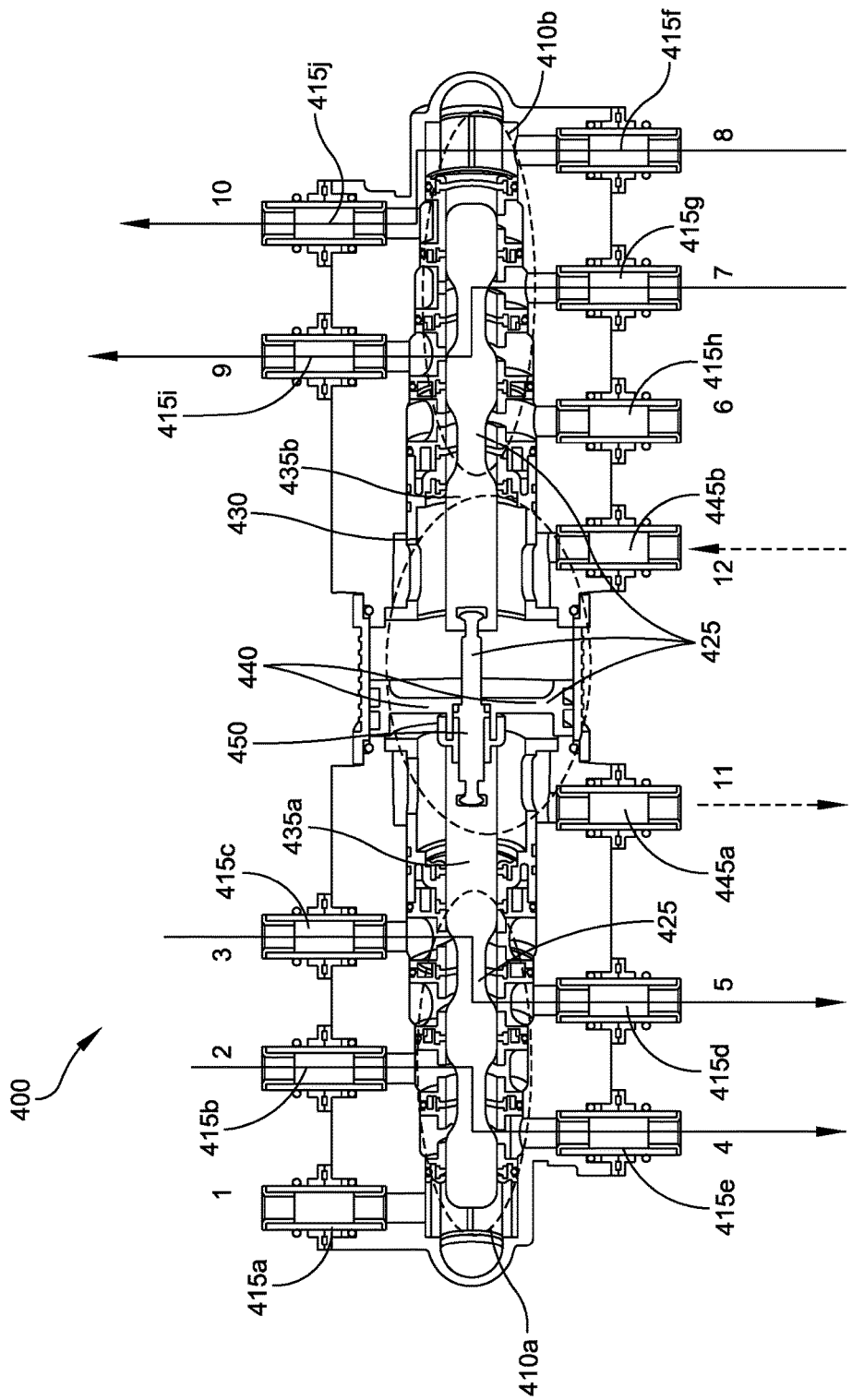
FIG. 4a is a first flow diagram of fluid flowpaths through the valve assembly of FIG. 3.
Figure 4B:
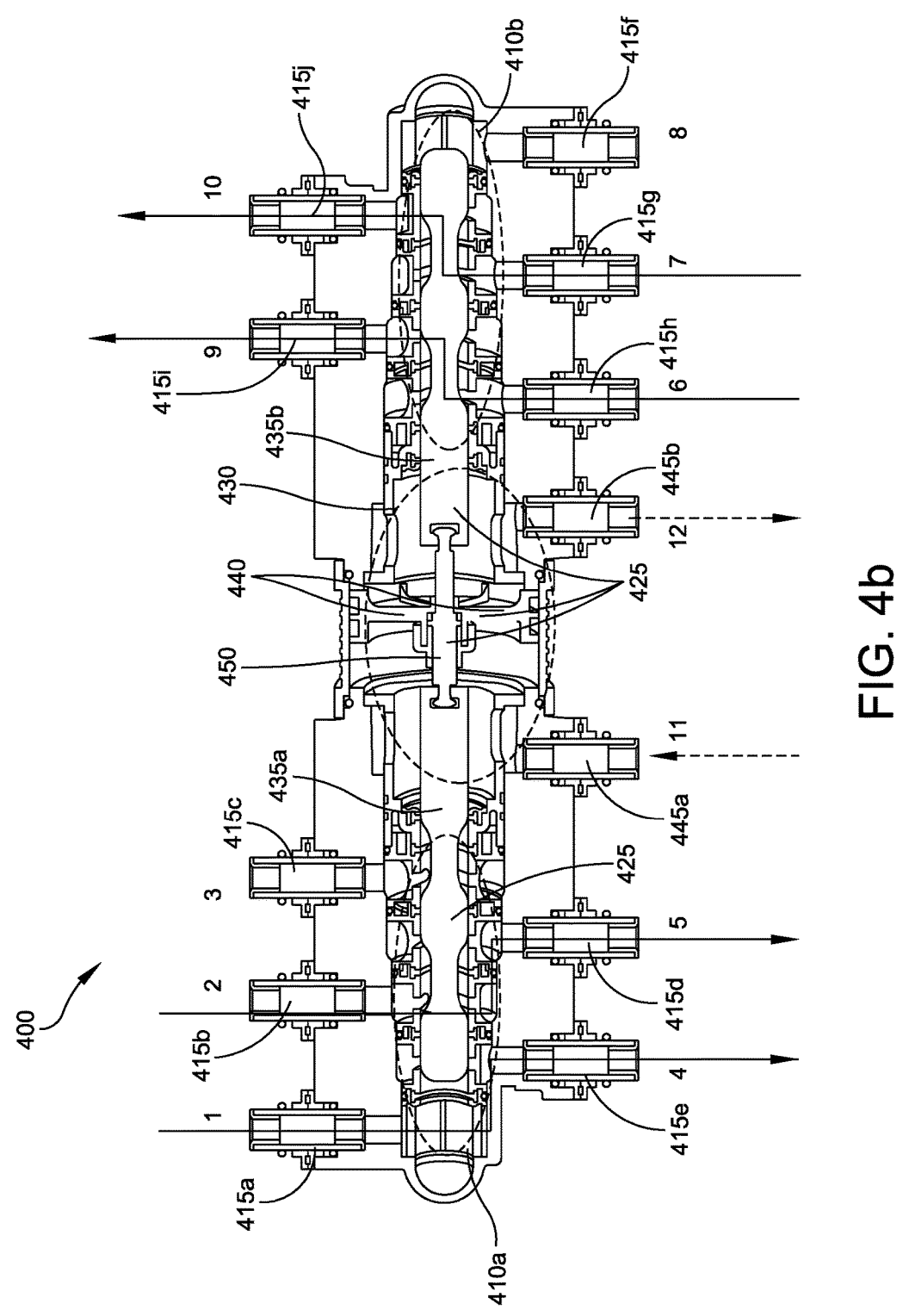

The actuator assembly 325 illustrated in FIG. 3 may be configured to move between a first position (FIG. 4a) and a second position (FIG. 4b). As illustrated in FIG. 4a, the first position of the actuator assembly 425 may be established by the flow of hydraulic fluid through actuation port 445b into actuation chamber 430 and against one side of sliding member 440, thereby forcing sliding member 440 to move to the first position, which in FIG. 4a is to the left. At the same time, hydraulic fluid present on the other side of sliding member 440 exits the actuation chamber 430 through actuation port 445a. The movement of the sliding member 440 to the first position also causes the connector 450 attached to the first portion 435a and second portion 435b of the stem 435 to move to the left. In some embodiments, the hydraulic fluid may be water, such as supply water provided by a municipality, and may be provided at a certain pressure. In other embodiments, the hydraulic fluid may be commercially obtained and be integrated into a separate hydraulic system that may be monitored and controlled.

Referring to the first chamber 410a of the valve assembly 400 illustrated in FIG. 4a, the first portion of the stem 435a is configured to allow for a first set of pairings between fluid ports 415b and 415c, which act as inlets, and fluid ports 415d and 415e, which act as outlets to the first chamber 410a. For example, fluid port 415b is paired with fluid port 415e to allow fluid to flow through the first chamber 410a and fluid port 415c is paired with fluid port 415d to allow fluid to flow through the first chamber 410a. Further, the pairing of fluid port 415b with fluid port 415e may form or be part of a fluid flowpath that may be in fluid communication with a concentrating compartment of an EDI device and the pairing of fluid port 415c with fluid port 415d may be in fluid communication with a depleting compartment of an EDI device. The fluid flowpaths associated with the each pairing of fluid ports may remain separate, and therefore not in fluid communication with each other as they flow through the first chamber 410a. At the same time, the first portion of stem 435a may block fluid from flowing through fluid port 415a.

In a similar manner as described above with reference to the first chamber 410a, when the actuator assembly 435 is in the first position, the second portion of the stem 435b is configured to allow for a first set of pairings between fluid ports 415f and 415g, which act as inlets, and fluid ports 415i and 415j, which act as outlets to the second chamber 410b. Fluid port 415g may be paired with fluid port 415i and fluid port 410f may be paired with fluid port 415j to allow fluid to flow through the second chamber 410b. When the actuator assembly is in the first position, the second portion of stem 435b may block fluid from flowing through fluid port 415h. According to one or more embodiments, the pairing of fluid port 415g with fluid port 415i may form or be part of a fluid flowpath that is in fluid communication with a depleting compartment of an EDI device and the pairing of fluid port 415f with fluid port 415j may form or be part of a fluid flowpath that is in fluid communication with a concentrating compartment of an EDI device.

The fluid flowpaths defined by the first position of the actuator assembly 425 may form or be part of a first liquid circuit, as discussed above with respect to the treatment system 10 depicted in FIG. 1. Further, the fluid flowpaths defined by the first position may allow for each flowpath to be in communication with either a depletion compartment or a concentrating compartment in an EDI device. The second position may signify a polarity reversal in the EDI device, and therefore the flowpaths associated with each respective compartment is reversed. For instance, a flowpath associated with a depletion stream may become a flowpath associated with a concentrating stream, and vice versa.

The second position of the actuator assembly 425 for valve assembly 400 is illustrated in FIG. 4b. The second position may be established by the flow of hydraulic fluid through actuation port 445a into actuation chamber 430 and against one side of sliding member 440. This forces sliding member 440 to move to the second position, which in FIG. 4b is to the right. As hydraulic fluid flows into the actuation chamber 430 against one side of sliding member 430, hydraulic fluid flows out through actuation port 445b on the other side of sliding member 430. In a similar manner as described above, the movement of the sliding member 440 to the second position causes the connector 450 attached to the first portion 435a and second portion 435b of the stem 435 to move to the right.

The second position may establish a second set of pairings between fluid ports 415a and 415b, which function as inlets to the first chamber 410a, and fluid ports 415d and 415e, which function as outlets to the first chamber 410a. For example, fluid port 415a may be paired with fluid port 415e, defining a fluid flowpath that may be in fluid communication with a depleting compartment of an EDI device. Fluid port 415b may be paired with fluid port 415d, defining a fluid flowpath that may be in fluid communication with a concentrating compartment of an EDI device. Fluid flowing from inlet fluid port 415c may be blocked by the first portion of stem 435a.

In reference to the second chamber 410b of FIG. 4b, the second position may establish a second set of pairings between fluid ports 415g and 415h, which may function as inlets, and fluid ports 415i and 415j, which may function as outlets. For example, fluid port 415h may be paired with fluid port 415i, defining a fluid flowpath that may be in fluid communication with a depleting compartment of an EDI device. Further, the second portion of stem 435b may block fluid from flowing through fluid port 415f. Fluid port 415g may be paired with fluid port 415j, defining a fluid flowpath that may be in fluid communication with a concentrating compartment of an EDI device.

The fluid flowpaths defined by the second position of the actuator assembly 425 may define or be part of a second liquid circuit, as discussed above with respect to the treatment system 10 depicted in FIG. 1. In addition, the fluid flowpaths defined by the second position may allow for each fluid flowpath to be in communication with either a depletion compartment or a concentrating compartment in an EDI device. As discussed above, the second position may signify a polarity reversal in the EDI device, and therefore the flowpaths associated with each respective compartment may be reversed.

In accordance with one embodiment, the actuator assembly may be configured to move to at least one interstitial position between the first position and the second position. For example, the valve assembly may be actuated by a motorized valve or solenoid valve that allows the actuator assembly to move to the interstitial position. The interstitial position may define a third series of fluid flowpaths through the plurality of fluid ports of the first chamber and the plurality of fluid ports of the second chamber. According to some embodiments, the third series of fluid flowpaths may allow multiple fluid ports of the valve assembly to be in fluid communication with each other. In certain instances, this may alleviate any pressure differential existing across the valve assembly. Referring to FIG. 3, one example of an interstitial position may allow fluid communication between fluid ports 315a-315e with one another and fluid communication with fluid ports 315f-315j with one another.

According to at least one example, fluid port 415a may function as a duplicate fluid port. For example, a depleting stream may be in fluid communication with fluid port 415a and 415c. The configuration and position of fluid port 415a allows for the depleting stream to exit the valve assembly 400 through either fluid port 415d or 415e. When the actuator assembly is in one position, then the depleting stream enters fluid port 415a and exits out fluid port 415e, while fluid port 415c is idle. When the actuator assembly is in a different position, then the depleting stream enters fluid port 415c and exits out fluid port 415d, while fluid port 415a is idle. The same situation applies to the other side of the valve assembly 400, where fluid port 415f may function as a duplicate port. For example, a depleting stream may be in fluid communication with fluid ports 415f and 415h. When the actuator assembly is in one position, then the depleting stream enters through fluid port 415h and exits through fluid port 415i, with fluid port 415f being idle. When the actuator assembly is in a different position, then the depleting stream enters through fluid port 415f and exits through fluid port 415j, with fluid port 415h being idle.

The valve assembly described above may be in communication with a controller, as discussed previously in reference to the treatment system. The controller may be connected or otherwise in communication with one or more components of the valve assembly. For example, the controller may be configured to control the position of the sliding member by allowing electrical signals to reach the sliding member, signifying which position the sliding member should be in. Switching the position of the sliding member may be triggered by one or more other events or measured parameters in the system. For example, a timed cycle regulating the treatment system may reverse the polarity of the EDI device, and therefore trigger the change in position of the sliding member to allow for stream reversal.

Although the embodiments discussed above in reference to FIGS. 4A and 4B described an actuator assembly that utilizes hydraulic fluid, other methods or configurations of actuation are within the scope of this disclosure. For example, the valve may be configured to have each portion of the stem be connected to its own actuator, instead of a common actuator. Further, the actuator may be driven by hydraulic pressure (as described) or may be driven by electrical power, or may be driven by both hydraulic pressure and electrical power. According to other embodiments, the valve may be actuated by air pressure, a gear motor, or a solenoid valve. For example, actuation of the actuation assembly 325 to the left or right may be actuated by a solenoid valve, where one side of the actuation chamber 330 is pressurized with water and the other side is at atmospheric pressure. To move in the opposite direction, the other side of the chamber is pressurized with water, while the first side is evacuated. According to another example, a gear motor may use a belt or chain-driven piston that moves the actuation assembly 325. For instance, when the motor rotates in a counter clockwise direction, the actuation assembly 325 may move in one direction, and when the motor rotates in a clockwise direction, the actuation assembly 325 moves in the opposite direction.

Figure 5:
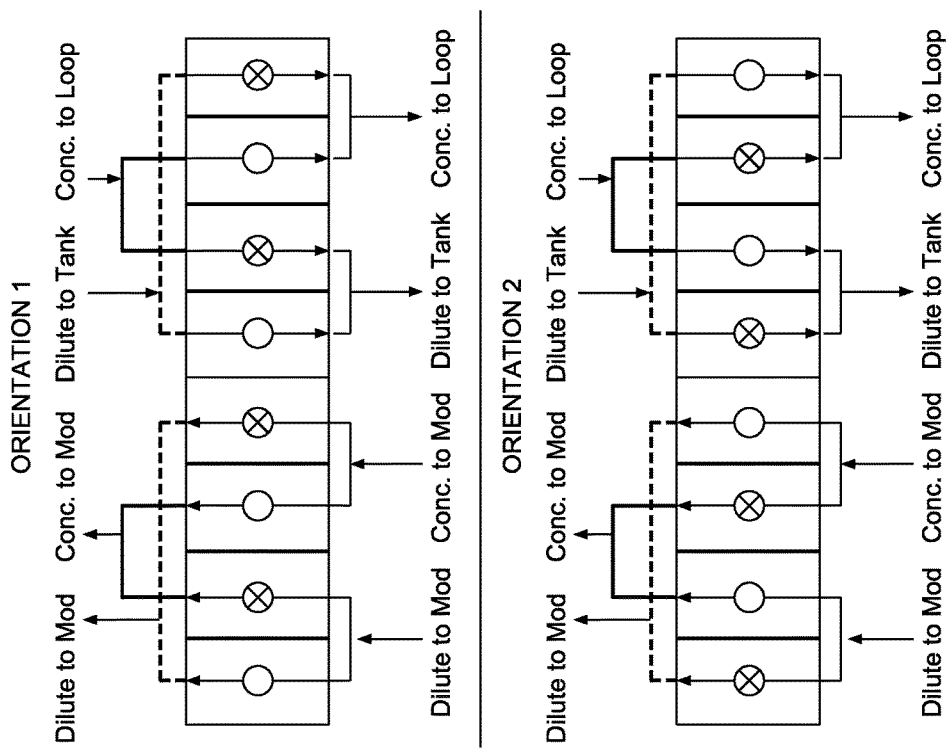
FIG. 5 is a diagram of a plurality of fluid flowpaths through a valve assembly according to one example.
Figure 6:
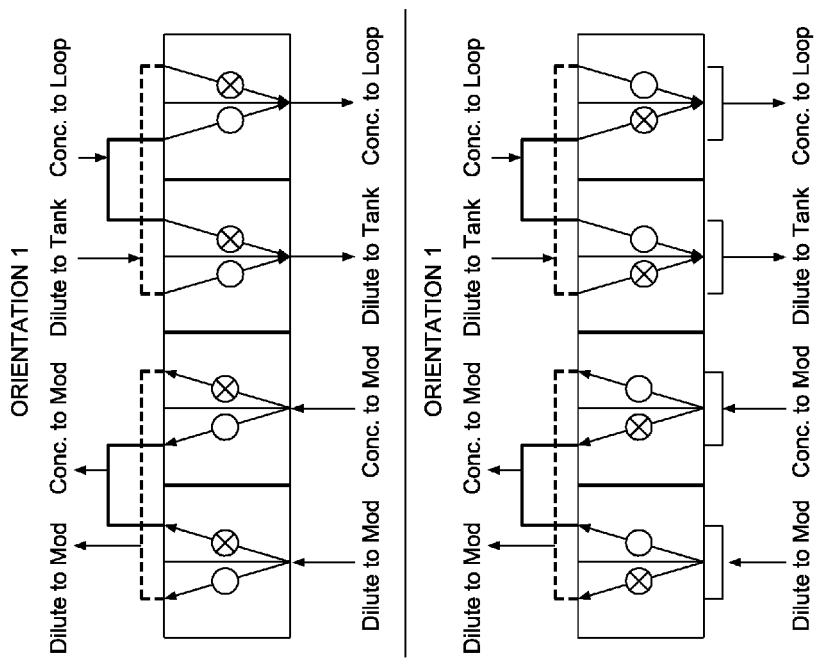
FIG. 6 is a diagram of a plurality of fluid flowpaths through a valve assembly according to a second example.
Figure 7:
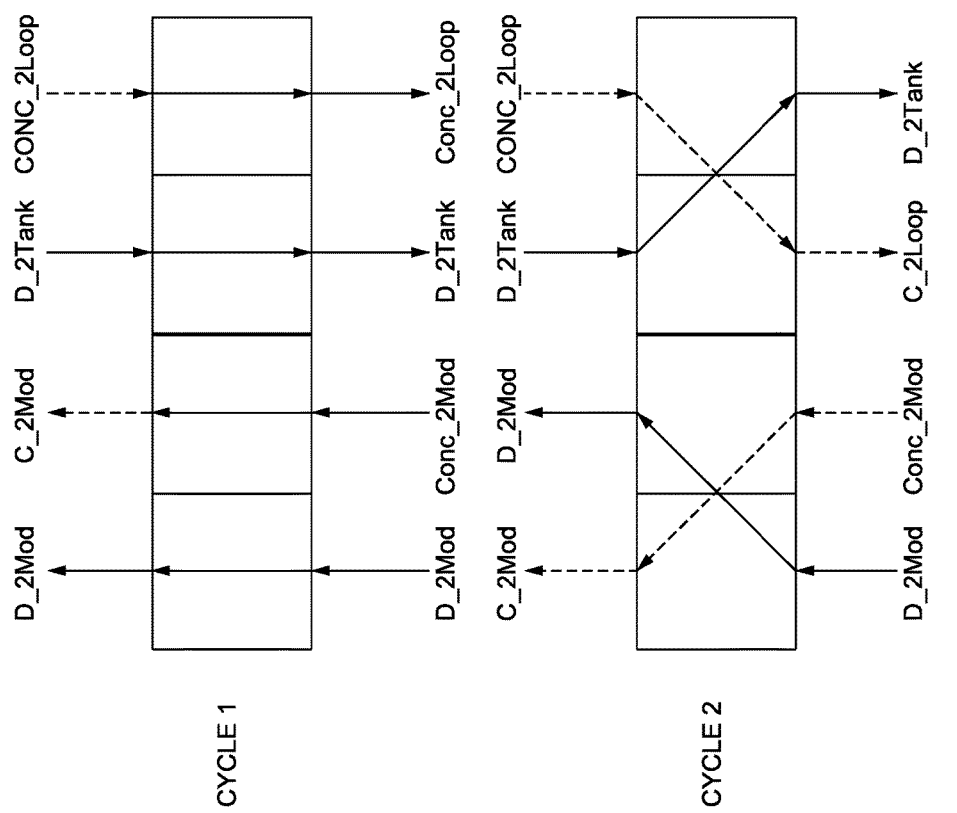
FIG. 7 is a diagram of a plurality of fluid flowpaths through a valve assembly according to a third example.

In addition, the valve assembly may be configured to provide for more than one fluid flow arrangement. For example, FIG. 5 illustrates a series of fluid flowpaths associated with a valve assembly configured to provide eight two-way valves to achieve similar functionality as two 4-way valves. The top portion of FIG. 5 illustrates the valve functionality in a first position or orientation, and the bottom portion illustrates the functionality in a second position or orientation. FIG. 6 illustrates a second, different arrangement, where the valve assembly is configured to provide four 3-way valves, which may achieve similar functionality as two 4-way valves. The top portion of FIG. 6 illustrates a first orientation of the valve assembly, while the bottom portion illustrates a second orientation. FIG. 7 illustrates a third arrangement where two 4-way valves may be reconfigured into a single manifold, which reduces both cost and size requirements associated with using two separate valves. The top portion of FIG. 7 illustrates a first orientation of the fluid flowpaths through the valve, and the bottom portion of FIG. 7 illustrates a second orientation.

According to a different embodiment, the valve assembly may be associated with a regenerable water treatment device, such as a reverse osmosis (RO) device, and/or a water softening device, such as water softening devices that are of the regenerable ion exchange type and are charged with cation resin in the sodium form and anion resin in the chloride form. As discussed above, the ion exchange resin becomes saturated with ionically bound hardness ion species and must be regenerated. Therefore, the valve assembly may actuate a first position associated with one or more fluid flowpaths that flow through the water softening device when the device operates to remove ionizable species from hard water, and a second position associated with one or more fluid flowpaths that are associated with regenerating the ionizable species.

Example

One or more performance characteristics or properties associated with an example of a valve assembly in accordance with the disclosure are listed below in Table 1.

TABLE 1

Non-limiting example of performance and physical properties of exemplary valve assembly

| Mechanical Properties | |
|---|---|
| Body | lead free brass, stainless steel, or potable water compatible material(s) |
| Port Size | ½ inch |
| Operating Pressure | 0-100 psi with 3x pressure safety factor |
| Maximum operating pressure differential across ports | 0 to 100 psi |
| Electrical Properties | |
| Operating Voltage | 120 V AC |
| Energization Time | instantaneous/fast |
| Performance Properties | |
| Pressure drop across valve | <1 psi at 2 gpm |
| Cycles | 20,000/year |
| Life | 5 year minimum |

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A valve assembly for controlling fluid flow comprising:
a housing comprising a first chamber and a second chamber;
an actuator assembly configured to move between a first position and a second position within the first and second chambers;
a plurality of fluid ports in fluid communication with the first chamber;
a plurality of fluid ports in fluid communication with the second chamber;
wherein the first position of the actuator assembly defines a first series of fluid flowpaths through the plurality of fluid ports of the first chamber and through the plurality of fluid ports of the second chamber, and the second position of the actuator assembly defines a second series of fluid flowpaths through the plurality of fluid ports of the first chamber and through the plurality of fluid ports of the second chamber.

2. The valve assembly of claim 1, wherein the plurality of fluid ports in communication with the first chamber further comprise a plurality of fluid inlet ports and a plurality of fluid outlet ports,
the plurality of fluid ports in communication with the second chamber further comprise a plurality of fluid inlet ports and a plurality of fluid outlet ports, and
the first position of the actuator assembly defines a first set of pairings between the fluid inlet ports and the fluid outlet ports, and
the second position of the actuator assembly defines a second set of pairings between the fluid inlet ports and the fluid outlet ports.

3. The valve assembly of claim 2, wherein the first set of pairings in fluid communication with the first chamber includes a first fluid inlet port in fluid communication with a first fluid outlet port and a second fluid inlet port in fluid communication with a second fluid outlet port, and the second set of pairings in communication with the first chamber includes a third fluid inlet port in fluid communication with the second fluid outlet port.

4. The valve assembly of claim 2, wherein the first set of pairings in fluid communication with the second chamber includes a first fluid inlet port in fluid communication with a first fluid outlet port and a second fluid inlet port in fluid communication with a second fluid outlet port, and the second set of pairings in fluid communication with the second chamber includes a third fluid inlet port in fluid communication with the first fluid outlet port.

5. The valve assembly of claim 1, further comprising an actuation chamber in communication with the first chamber and the second chamber.

6. The valve assembly of claim 5, wherein the actuation chamber comprises a first compartment in communication with the first chamber and a second compartment in communication with the second chamber.

7. The valve assembly of claim 6, further comprising a first actuation port in fluid communication with the first chamber and a second actuation port in fluid communication with the second chamber, the actuator assembly configured to move to the first position when a hydraulic fluid exits the first actuation port and enters the second actuation port, and to move to the second position when the hydraulic fluid enters the first actuation port and exits the second actuation port.

8. The valve assembly of claim 1, wherein the actuator assembly comprises a stem having a first portion extending into the first chamber and a second portion extending into the second chamber.

9. The valve assembly of claim 1, wherein the first chamber comprises a stepped wall configuration having an expanding diameter and the second chamber comprises a stepped wall configuration having an expanding diameter.

10. The valve assembly of claim 9, wherein at least one step of the stepped wall configuration of the first chamber and the second chamber includes a fluid port.

11. The valve assembly of claim 1, wherein at least one fluid port in fluid communication with the first chamber has a different diameter than the other fluid ports in fluid communication with the first chamber, and at least one fluid port in fluid communication with the second chamber has a different diameter than the other fluid ports in fluid communication with the second chamber.

12. The valve assembly of claim 1, wherein the actuator assembly is configured to move to at least one interstitial position in between the first position and the second position,
wherein the interstitial position defines a third series of fluid flowpaths through the plurality of fluid ports of the first chamber and the plurality of fluid ports of the second chamber.

13. A treatment system comprising:
an electrochemical device comprising a first compartment and a second compartment;
a valve assembly configured to operate in a first position and a second position;
a first series of fluid flowpaths in fluid communication with the valve assembly and at least one of the first compartment and the second compartment of the electrochemical device when the valve assembly is configured in the first position; and
a second series of fluid flowpaths in fluid communication with the valve assembly and at least one of the first compartment and the second compartment of the electrochemical device when the valve assembly is configured in the second position.

14. The treatment system of claim 13, wherein the valve assembly further comprises a plurality of fluid inlet ports and fluid outlet ports, and the first series of fluid flowpaths comprises pairings of fluid inlet ports and fluid outlet ports, and the second series of fluid flowpaths comprises pairings of fluid inlet ports and fluid outlet ports.

15. The treatment system of claim 14, wherein the electrochemical device is an electrodeionization device and the first compartment is a depleting compartment and the second compartment is a concentrating compartment, and
the first position of the valve assembly is configured to allow fluid communication of the concentrating compartment with a first set of pairings of fluid inlet ports and fluid outlet ports,
the first position of the valve assembly is configured to allow fluid communication of the depleting compartment with a second set of pairings of fluid inlet ports and fluid outlet ports,
the second position of the valve assembly is configured to allow fluid communication of the concentrating compartment with a third set of pairings of fluid inlet ports and fluid outlet ports, and
the second position of the valve assembly is configured to allow fluid communication of the depleting compartment with a fourth set of pairings of fluid inlet ports and fluid outlet ports.

16. The treatment system of claim 13, further comprising a controller in communication with the electrochemical device and the valve assembly, the controller configured to actuate the valve assembly between the first position and the second position, wherein the valve assembly is configured to be actuated by at least one of hydraulic pressure, electrical power, air pressure, a gear motor, and a solenoid valve.

17. The treatment system of claim 16, further comprising at least one sensor in communication with the controller and in fluid communication with at least one of the first series of fluid flowpaths and the second series of fluid flowpaths, and configured to measure at least one of turbidity, alkalinity, water conductivity, pH, temperature, pressure, TDS, and flow rate, and the valve is actuated between the first position and the second position based on at least one of the measured pressure, the measured flow rate, and the measured water conductivity.

18. The treatment system of claim 13, wherein the valve assembly is configured to operate in the first position and the second position using a single actuation mechanism.

19. The treatment system of claim 13, wherein the valve assembly is associated with a water softening device comprising ion exchange resin.

20. The treatment system of claim 19, wherein the first position of the valve assembly is configured to be associated with one or more fluid flowpaths that flow through the water softening device when the water softening device operates to remove ionizable species, and the second position of the valve assembly is configured to be associated with one or more fluid flowpaths that are associated with regenerating the ionizable species.

* * * * *